(12) United States Patent
Castel et al.

(10) Patent No.: US 6,453,794 B2
(45) Date of Patent: Sep. 24, 2002

(54) DIAPHRAGM SUPPORT FOR A BRAKE BOOSTER AND BRAKE BOOSTER INCORPORATING SUCH A SUPPORT

(75) Inventors: Philippe Geirges Castel, Paris; Gerard Lebaudy, Taverny, both of (FR)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 09/731,475

(22) Filed: Dec. 6, 2000

(30) Foreign Application Priority Data

Dec. 7, 1999 (FR) .............................................. 99 15430

(51) Int. Cl.[7] .................................................. F15B 9/10
(52) U.S. Cl. ...................................... 91/376 R; 92/980
(58) Field of Search ............................... 92/98 R, 98 D, 92/105; 91/376 R

(56) References Cited

U.S. PATENT DOCUMENTS

| 3,628,422 A | * 12/1971 | Acre .......................... 91/369.4 |
| 4,007,664 A | 2/1977 | Popp |
| 5,716,110 A | * 2/1998 | Sunami et al. ........... 303/114.3 |
| 5,992,947 A | 11/1999 | Tsubouchi |

OTHER PUBLICATIONS

Nov. 8, 2000 9915430 French Search Report.

* cited by examiner

*Primary Examiner*—Edward K. Look
*Assistant Examiner*—Michael Leslie
(74) *Attorney, Agent, or Firm*—Scott A. McBain

(57) ABSTRACT

This diaphragm support (18) for a motor vehicle brake booster comprises a central region (40) intended to be fixed to a piston (14) of the brake booster and a peripheral region (41). At least part of the support (18) extending from the central region towards the peripheral region includes a stratified structure consisting of a superposition of at least two sheets (42, 44) joined together.

18 Claims, 2 Drawing Sheets

DIAPHRAGM SUPPORT FOR A BRAKE BOOSTER AND BRAKE BOOSTER INCORPORATING SUCH A SUPPORT

TECHNICAL FIELD

The present invention relates to brake boosters for motor vehicles and deals more specifically with a diaphragm support for such brake boosters.

BACKGROUND OF THE INVENTION

Braking systems generally include a master cylinder intended to apply the pressure of the brake fluid to the brakes of a vehicle when a brake pedal is actuated.

Inserted between the master cylinder and the brake pedal is a brake booster, for example of the vacuum type.

There are various types of brake booster.

For example, a booster of this kind comprises, in the known way, an enclosure, a diaphragm mounted on a support and dividing the enclosure into a front chamber which is equipped with means for connection to a source of vacuum and a rear chamber, a piston which can move axially in the enclosure and on which the support is mounted, a plunger mounted so that it can be moved axially in the piston under the control of a brake pedal between an unstable forward braking position and a retreated stable position of rest, and a valve interacting with seats provided on the piston and on the plunger so as, on the one hand, to isolate the rear chamber from the ambient surroundings and to place this chamber in communication with the front chamber when the plunger is in the position of rest and, on the other hand, isolate the rear chamber from the front chamber and place the rear chamber in communication with the ambient surroundings during braking.

A booster of this kind allows the braking force applied to the brake pedal to be increased by a multiplying coefficient which may, for example, be as high as 9.

The forces which the diaphragm and its support have to withstand are relatively high. In particular, the radially internal region of the support, which is fixed to the piston, is very highly stressed in so far as the opposite peripheral region is free to oscillate.

In consequence, this region is subjected to bending forces that steel, which is often used for producing the supports, is incapable of withstanding in a durable manner, unless great thicknesses are used.

SUMMARY OF THE INVENTION

The object of the invention is to remedy this drawback.

The subject of the invention is therefore a diaphragm support for a motor vehicle brake booster, comprising a central region intended to be fixed to a piston of the brake booster and comprising a peripheral region, characterized in that at least part of the support extending from the central region towards the peripheral region includes a stratified structure consisting of a superposition of at least two sheets joined together.

The bending strength of the support is thus increased without the need to increase the thickness of the support.

This diaphragm support may also have one or more of the following features, taken in isolation or in any technically feasible combination:

the sheets are made of steel,
the sheets are made of aluminum,
an assembling material including an element chosen from polypropylene and polyamide is placed between the sheets,
the entire support is made of the said stratified structure,
the peripheral region has a folded-over or curved edge,
the said sheets have complementing local deformations formed near their peripheral region,
it includes additional means of joining the said sheets together, these means comprising at least one element chosen from screws, rivets, welding and bolts, provided near the peripheral region.

Another subject of the invention is a method for manufacturing a diaphragm support for a motor vehicle brake booster, characterized in that it consists in pressing a stratified panel consisting of an assembly of stacked sheets between which a material for joining the said sheets together is placed.

Finally, a further subject of the invention is a brake booster of the aforementioned type, characterized in that the support consists of a diaphragm support as defined hereinabove.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
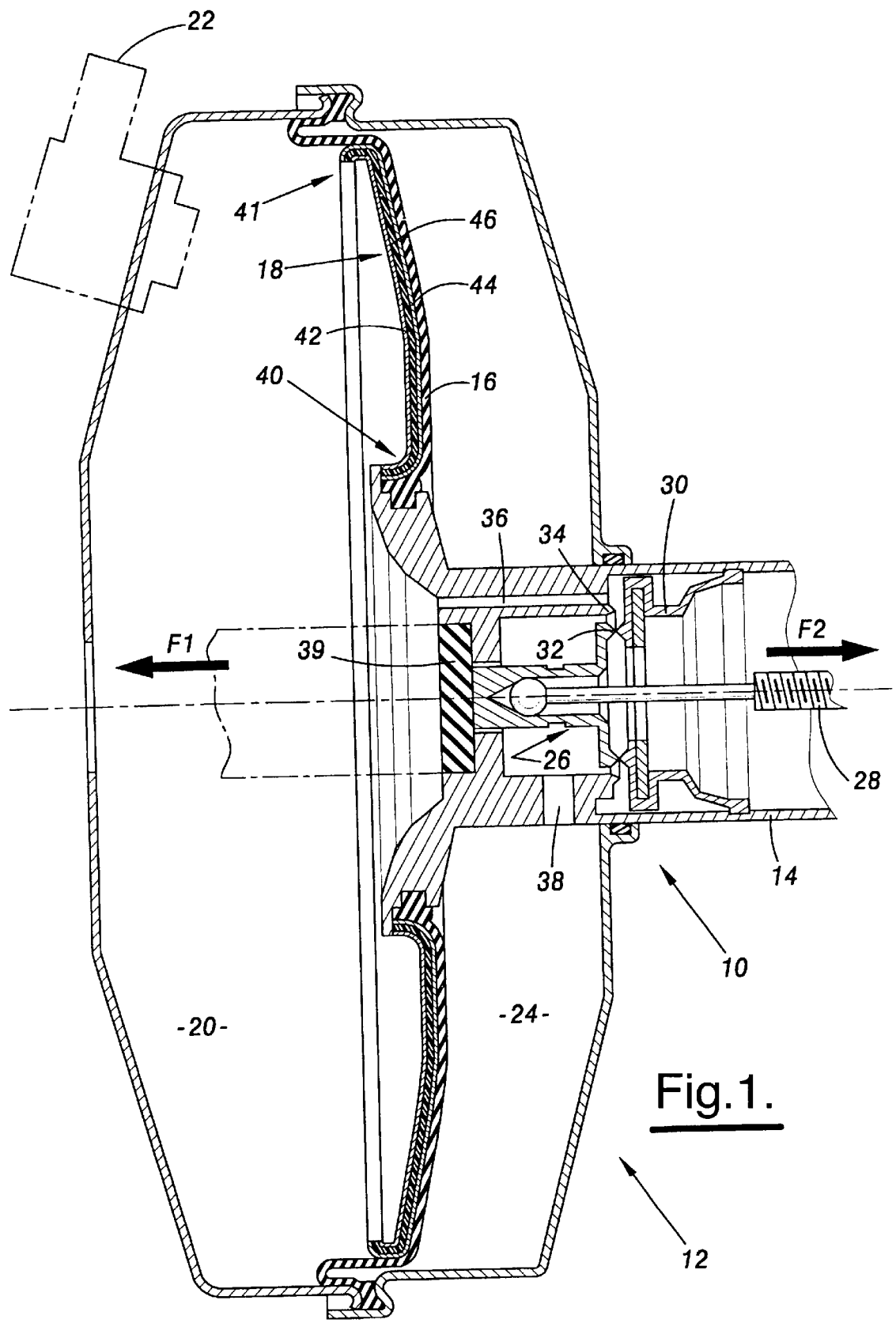
FIG. 1 is a view in longitudinal section of a brake booster.

Depicted in section in FIG. 1 is a view of a vacuum brake booster denoted by the overall numerical reference 10.

It includes: a closed enclosure 12; a piston 14 which can move axially in the enclosure and part of which is in communication with the ambient air; a diaphragm 16 which is mounted on a diaphragm support 18 joined to the piston 14 and which divides the enclosure 12 into a front chamber 20 equipped with means 22 of connection to a source of vacuum (not depicted) and a rear chamber 24 in which the pressure is variable; a plunger 26 mounted so that it can move axially in the piston 14 and to which there is secured an operating rod 28 connected to the brake pedal of a motor vehicle; and a valve 30 cooperating with seats 32 and 34 borne by the plunger and the piston respectively.

Passages 36 and 38 are formed in the piston 14 to, respectively, place the front chamber 20 in communication with the rear chamber 24 and place the rear chamber 24 in communication with the ambient surroundings under the control of the plunger 26 and the valve 30.

The plunger 26 is mounted so that it can move in the piston 14 between a forward braking position and a retreated position of rest. Elastic means, not depicted, urge the plunger 26 towards the position of rest.

In FIG. 1, the brake booster 10 is depicted in the position of rest. In this position, the valve 30 generally made of rubber and resting on the seat 32 or "air seat" of the plunger 26 is spaced away from the seat 34 or "vacuum seat" of the piston 14.

As a result, the front chamber 20 and the rear chamber 24 are in communication via the passages 36 and 38 and are at the same pressure which is the pressure delivered by the vacuum source with which the appliance communicates.

When force is exerted on the brake pedal, the plunger 26 moves in the direction depicted by the arrow F1, that is to say in the direction of the front chamber 20. During this movement, the plunger 26 exerts force on the central part of an elastically deformable reaction disc 39 arranged in a dish (not depicted).

The resulting peripheral deformation of the disc 39 causes the piston 14 to move in the direction depicted by the arrow F2, which causes the seat 34 of the piston to press against the valve 30 and move the latter in the direction F2.

This movement causes the valve 30 to become spaced away from the seat 32 of the plunger 26 and therefore causes the rear chamber 24 to be placed in communication with the atmosphere via the passage 38, by placing the rear chamber 24 in communication with that part of the piston 14 which communicates with the ambient air.

Thus, the brake force is boosted by means of the pressure difference across the diaphragm 16.

As was mentioned earlier, this boosting of the brake force generates considerable force on the support and, in particular, on that part of the support which lies near the radially internal region 40 thereof via which it is fixed to the piston 14.

Specifically, it may be seen that, whereas the radially external region 41 of the support 18 is free to oscillate when subjected to a difference in pressure between the front chamber 20 and rear chamber 24, the radially internal region 40 of the support is secured to the piston 14 and is therefore subjected to a high bending force.

The design of such a support relies on giving consideration to various constraints:

the endurance of the braking system under normal conditions of demand, and the reasonable maximum deformation.

Figure 2:
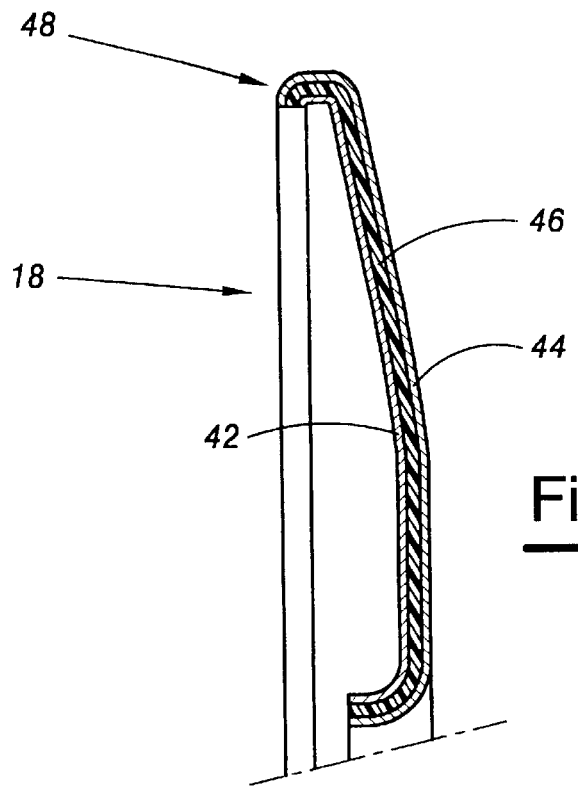
FIG. 2 is a detail view, on a larger scale, of the diaphragm support of the booster of FIG. 1.

Referring also to FIG. 2, in order for the support to be capable of not deforming excessively under these forces, at least part of the support extending from the central region 40 towards the peripheral region 41 has a stratified structure.

This stratified structure consists of a superposition of at least two sheets 42 and 44 joined together.

A layer 46 of assembly material extends between these sheets 42 and 44.

For example, the sheets 42 and 44 are made of steel or aluminum.

The assembly material, for its part, consists of a material capable of firmly joining the sheets together in such a way as to prevent one of them from slipping relative to the other. The bending deformation of the support is thus reduced in so far as the mutual displacement of the sheets generated when these sheets adopt a curvature is avoided.

For example, the assembly material includes polypropylene or polyamide.

As an alternative, it would also be possible to use an adhesive suited to the envisaged use, that is to say capable of joining the sheets together to prevent a displacement of one of them with respect to the other.

Whereas in the embodiment depicted in FIGS. 1 and 2, the assembly layer 46 has a continuous structure, it could just as easily consist of a discontinuous layer, provided it makes it possible to prevent any slippage of the two sheets 42 and 44 one relative to the other.

Figure 3:
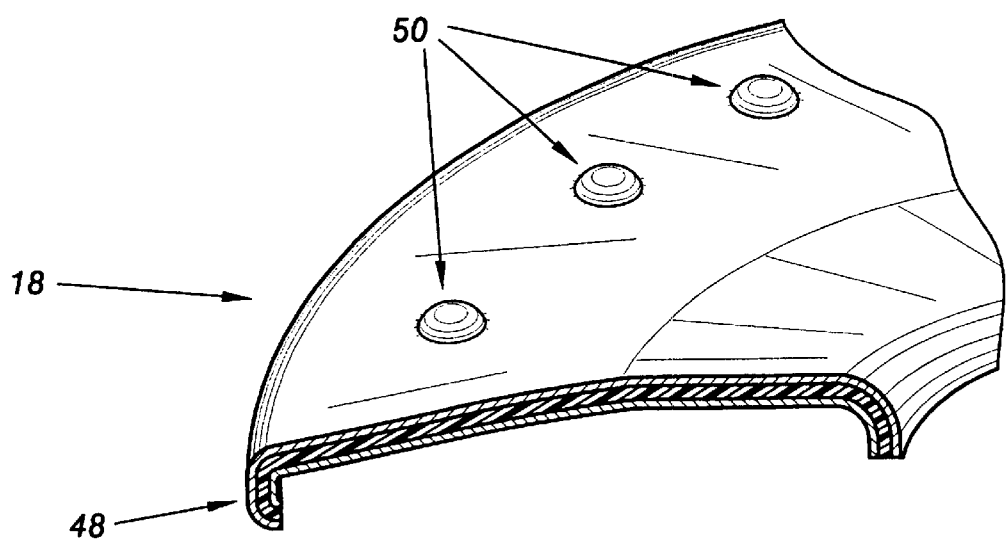
FIG. 3 is a perspective view of part of a diaphragm support according to a particular embodiment.

As can also be seen in FIG. 3, the part of the support 18 which lies near the end region may be provided with additional means for joining the sheets together.

These additional attachment means may, for example, be produced by giving the outer peripheral region a folded-over 48 or turned-down edge, or by forming in the sheets 42 and 44, preferably near their peripheral region, local deformations which are obtained by pressing, such as 50, which, for example, are in the form of concave portions or holes suitable, in conjunction with the presence of the layer 46 of assembly material, of preventing one of the sheets 42 and 44 from slipping relative to the other.

Finally, these additional attachment means could be produced in the form of screw fasteners, rivets, welds or bolts, possibly combined, arranged near the peripheral region of the support.

For example, the support 18 is produced by pressing a stratified panel including two steel sheets each 0.4 mm or 0.5 mm thick, with the interposition of a thermoplastic about 0.5 mm thick.

It has been found that a support of this kind presents a weight saving of about 50% by comparison with a traditional support, while at the same time having better bending strength. It is actually found that the bending thus obtained corresponds to that of a steel support approximately 25% thicker.

Finally, whereas in the embodiments described with reference to FIGS. 1 to 3, the support is made of a stratified structure comprising two sheets joined together, this structure could just as easily be made using a higher number of sheets.

What is claimed is:

1. Diaphragm support for a motor vehicle brake booster, comprising a central region intended to be fixed to a piston of the brake booster and a peripheral region, characterized in that at least part of the support extending from the central region towards the peripheral region includes a stratified structure consisting of a superposition of at least two sheets joined together and characterized in that an assembly material including an element chosen from polypropylene and polyamide is placed between the sheets.

2. Diaphragm support according to claim 1, characterized in that the sheets are made of steel.

3. Diaphragm support according to claim 1, characterized in that the sheets are made of aluminum.

4. A diaphragm support for supporting a diaphragm of a brake booster, comprising:

a body including a central region fixedly attached to a piston, and a peripheral region, wherein at least a portion of the body comprises a stratified structure of at least two sheets joined together having an assembly material placed between the at least two sheets, wherein the diaphragm support and the diaphragm are separate elements.

5. The diaphragm support of claim 4, wherein the assembly material is selected from a group consisting of polypropylene and polyamide.

6. The diaphragm support of claim 4, wherein the at least two sheets are made of steel.

7. The diaphragm support of claim 4, wherein the at least two sheets are made of aluminum.

8. The diaphragm support of claim 4, wherein the entire support is a stratified structure of at least two sheets joined together.

9. The diaphragm support of claim 4, wherein the peripheral region consists of a fold-over edge.

10. The diaphragm support of claim 4, wherein the sheets are joined using complementing deformations formed adjacent the peripheral region.

11. The diaphragm support of claim 4, wherein the at least two sheets are joined together by joining means selected from a group consisting of screws, rivets, welding and bolts.

12. A method for manufacturing a diaphragm support comprising:

joining at least two sheets together with an assembly material between the at least two sheets; and forming the joined sheets into a diaphragm support having a body including a central region and a peripheral region.

13. The method of claim 12 wherein the assembly material is selected from a group consisting of polypropylene and polyamide.

14. The method of claim 12 further comprising:

forming a folded-over edge adjacent the peripheral region.

15. The method of claim 12 wherein the at least two sheets are formed from material selected from a group consisting of steel and aluminum.

16. A brake booster comprising:

an enclosure;

a diaphragm mounted on a support and dividing the enclosure into a front chamber and a rear chamber, wherein the front chamber includes a connection to a source of vacuum;

a piston which can move axially in the enclosure and on which the support is mounted;

a plunger mounted so that it can be moved axially in the piston under the control of a brake pedal between an unstable forward braking position and a retreated stable position of rest; and a valve interacting with seats provided on the piston and on the plunger so as to isolate the rear chamber from the ambient surroundings and to place this chamber in communication with the front chamber when the plunger is in the position of rest and isolate the rear chamber in communication with the ambient surroundings during braking;

wherein the support consists of a diaphragm support comprising a body including a central region fixedly attached to a piston, and a peripheral region, wherein at least a portion of the body comprises a stratified structure of at least two sheets joined together, with an assembly material between the least two sheets.

17. The brake booster of claim 16 wherein the at least two sheets of the diaphragm support are made of material selected from a group consisting of steel and aluminum.

18. The brake booster of claim 16 wherein the at least two sheets of the diaphragm support are joined using complementing deformations formed adjacent the peripheral region.

* * * * *